United States Patent
Jackson et al.

(10) Patent No.: US 11,058,120 B2
(45) Date of Patent: Jul. 13, 2021

(54) COMPOSITION OF ENTOMOPATHOGENIC FUNGUS AND METHOD OF PRODUCTION AND APPLICATION FOR INSECT CONTROL

(71) Applicant: The United States of America, as Represented by the Secretary of Agriculture, Washington, DC (US)

(72) Inventors: Mark A. Jackson, Peoria, IL (US); Stefan T. Jaronski, Sydney, MT (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 1386 days.

(21) Appl. No.: 14/854,133

(22) Filed: Sep. 15, 2015

(65) Prior Publication Data

US 2016/0000092 A1    Jan. 7, 2016
US 2019/0387750 A9    Dec. 26, 2019

Related U.S. Application Data

(63) Continuation of application No. 12/909,943, filed on Oct. 22, 2010, now abandoned, which is a continuation of application No. 11/901,547, filed on Sep. 13, 2007, now abandoned.

(51) Int. Cl.
*A01N 65/00*    (2009.01)
*A01G 18/00*    (2018.01)
*A01N 63/30*    (2020.01)

(52) U.S. Cl.
CPC ............ *A01N 65/00* (2013.01); *A01G 18/00* (2018.02); *A01N 63/30* (2020.01)

(58) Field of Classification Search
None
See application file for complete search history.

(56) References Cited

PUBLICATIONS

Shah et al., Evaluation of black vine weevil (*Otiorhynchus sulcatus*) control strategies using *Metarhizium anisopliae* with sublethal doses of insecticides in disparate horticultural growing media 2007, Biological Control, 40: 246-252 (Year: 2007).*

Shah et al., Nutrition influences growth and virulence of the insect-pathogenic fungus *Metarhizium anisopliae*, 2005, J. FEMS Microbiology Letters, 251: 259-266 (Year: 2005).*

Jackson et al., Production of microsclerotia of the fungal entomopathogen *Metarhizium anisopliae* and their potential for use as a biocontrol agent for soil-inhabiting insects, 2009, mycological research 113: 842-850.*

Jackson, Optmizing nutgritional conditions for the liquid culture producction of effective fungall biological control agents, 1997, J Industrial Microbiology & Biotechnology, 19: 180-187.*

* cited by examiner

*Primary Examiner* — Terry A McKelvey
*Assistant Examiner* — Catheryne Chen
(74) *Attorney, Agent, or Firm* — John D. Fado; Mark D. McNemar

(57) ABSTRACT

Microsclerotia of entomopathogenic fungi, including *Metarhizium* species, *Beauveria* species, and *Lecanicillium* species, may be produced. These microsclerotia are effective for the control of a wide variety of insect pests, particularly soil-dwelling insect pests.

9 Claims, 1 Drawing Sheet

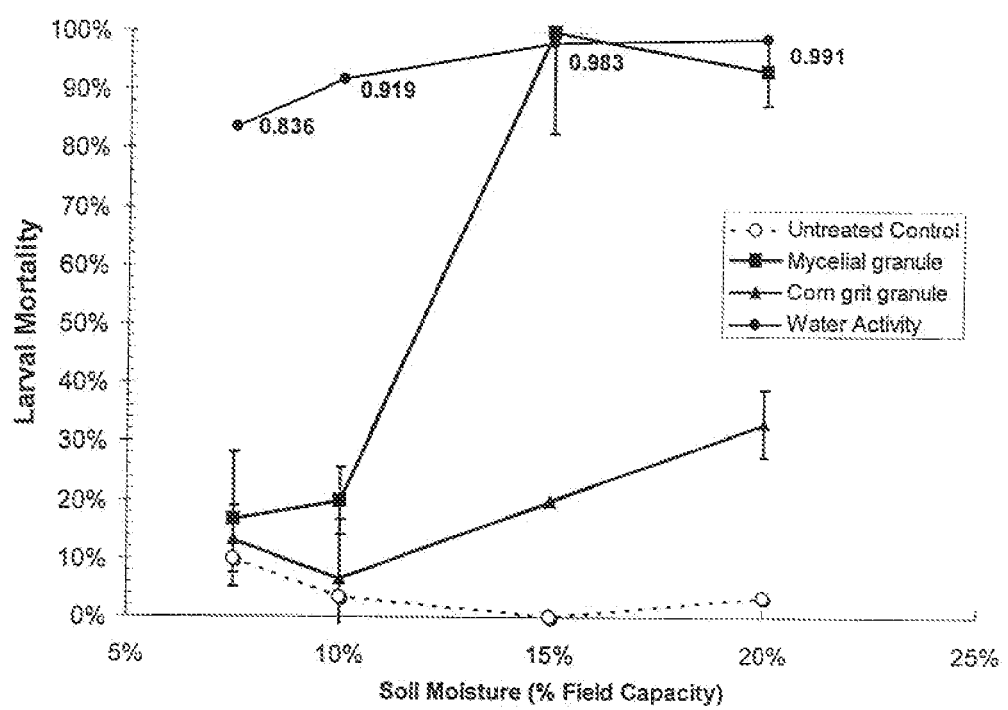

COMPOSITION OF ENTOMOPATHOGENIC FUNGUS AND METHOD OF PRODUCTION AND APPLICATION FOR INSECT CONTROL

CROSS-REFERENCE TO RELATED APPLICATIONS

This application is a continuation of U.S. patent application Ser. No. 12/909,943, filed on Oct. 22, 2010, which is a continuation of U.S. patent application Ser. No. 11/901,547, filed on Sep. 13, 2007 (now abandoned), the contents of which are hereby incorporated by reference herein in their entirety.

BACKGROUND OF THE INVENTION

Field of the Invention

The invention relates to the formation of microsclerotial propagules by entomopathogenic fungi and the use of those microsclerotial for the control of insects.

Description of the Prior Art

Chemical pesticides have been used for control of insect and weed control for over 60 years. Interest in the use of biologically-based pest control measures has been brought about by the development of pest resistance to many chemical pesticides coupled with public concerns about the adverse impact of widespread chemical use on human health, food safety and the environment (Gillespie and Moorhouse, 1989, Biotechnology of Fungi for Improving Plant Growth, pp 85-125; Hajek, 1993, New options for insect control using fungi, In, Pest Management: Biologically Based Technologies, (R. D. Lumsden and J. Vaugn, eds.) Amer. Chem. Soc. Washington, D.C.; Leathers et al., 1994, J. Industrial Microbiology 12:69-75). In the late $19^{th}$ century, Metchnikoff was the first to describe *Metarhizium anisopliae* "green muscardine" infections on the cereal cockchafer and suggested the use of the microorganism as a biological control agent for insects (Zimmermann et al., 1995, Biocontrol Science and Technology, 5:527-30). Subsequent, studies showed that an application of *M. anisopliae* spores could kill the cereal cockchafer and the sugarbeet weevil via direct infection. Initial production methods for this fungus focused on the use of the host insect or artificial media as a growth vehicle for producing conidia of the pathogen.

The choice of pursuing soil-dwelling insects as targets for biological control, versus insects on the phylloplane, is tempting. Among these targets are root weevils, soil grubs, rootworms, wireworms, fruit flies, and root maggots (Bruck, 2005, Biological Control, 32:155-163; Krueger and Roberts, 1997, Biological Control, 9:67-74; Chandler and Davidson, 2005, Journal of Economic Entomology, 98:1856-1862; Vanninen et al., 1999, Journal of Applied Entomology, 123:107-113; Kabaluk et al., 2005, IOBC/wprs Bulletin, 28:109-1155. UV radiation, which can result in a very short persistence on plant surfaces, is avoided. Rainfall, washing the infectious conidia off foliage shortly after an application, is not a concern. Soil temperatures are moderated by its insulative value, and soil moistures above the permanent wilting point of plants are well within the optimal range for microorganisms.

The entomopathogenic fungus *Metarhizium anisopliae* has been registered as a biological insecticide for the control of soil-dwelling and cryptic insect pests in the United States and many other countries. *Metarhizium anisopliae* has been reported to infect more than 100 insects including the soil-dwelling insects listed: subterranean termites (*Reticulitermes* and *Coptotermes* spp.), corn rootworms (*Diabrotica* spp), black vine weevils (*Otioxhyzichus sulcatus*), citrus root weevils (*Diaprepes abbreviates*), Japanese beetles (*Popillia japonica*), and European chafers (*Rhizotrogus majalis*) (Krueger et al., 1992, Journal of Invertebrate Pathology, 59: 54-60; Schwarz, 1995, *Metarhizium anisopliae* for soil pest control. In Biorational Pest Control Agents; Formulation and Delivery, F. R. Hale and J. W. Barry, eds., ACS Symposium Series 595, American Chemical Society, Washington, D.C. p. 183-196; Krueger and Roberts, 1997, ibid; Bruck, 2005, ibid). Commercial interest in using *M. anisopliae* to control soil-dwelling insects has resulted in the development of granular pest control formulations based on liquid culture-produced mycelial pellets or solid substrate-produced conidia on a nutritive or non-nutritive carrier, or fungus on the spent solid substrate, itself (Schwarz, 1995, ibid; Storey et al., 1990, Conidiation kinetics of the microsclerotial granules of *Metarhizium anisopliae* (Bio 1020) and its biological activity against different soil insects. Proceedings of the Vth international Colloquium on Invertebrate Pathology and Microbial Control, Adelaide, Australia, p. 320-325; Andersch et al., 1995, U.S. Pat. No. 5,418,164), the most practical formulation being the mycelial pellet. The fungus on these granular formulations must necessarily grow out from the carrier and resporuiate to produce the infectious conidia. Since the infective propagules (conidia) of *M. anisopliae* must contact and infect the insect host, the number, distribution and persistence of conidia, as produced by fungus on a granular carrier, in the soil is of utmost importance (Bruck, 2005, ibid Hu and St. Ledger, 2002). Practical application of these formulations has been limited because of product physical characteristics precluding use in conventional farm equipment, high production costs, and/or poor practical shelf life. Mycelial, pellets, such as disclosed in U.S. Pat. No. 5,418,164, have generally poor, room-temperature shelf life or must be lyophilized, an expensive process. Conidia, blastospores or mycelium in sodium alginate (U.S. Pat. No. 5,360,607; Knudsen et al., 1990, J. Econ. Entomol., 83 (6):2225-2228; Meyer 1994, Fund. Applied Hematology, 17 (6):563-567) have been commercialized, but this formulation is too expensive for general use in field crops, and suffers from poor room temperature shelf-life. Conidia (produced in solid substrate fermentation) bound to a granular carrier generally have poor shelf life. Spent solid substrate fermentation granules (typically rice, barley, wheat grains) containing residual fungus after harvest of conidia, cannot be applied using conventional farm equipment nor can they be readily ground to the proper size without killing the fungus, even though this formulation is readily available as a by-product of conidia production.

For persistence in soil and decaying plant material, many plant pathogenic fungi produce sclerotia; i.e., melanized, compact hyphal aggregates that are highly resistant to desiccation. These propagules often serve as the overwintering structure for the fungus (Cooke, 1983, Morphogenesis of sclerotia. In "Fungal Differentiation: A Contemporary Synthesis" Smith, J. E., ed. pp 397-418. Marcel Dekker, Inc., New York, N.Y., U.S.A.; Coley-Smith and Cooke, 1971, Survival and germination of fungal sclerotia. In "Annual Review of Phytopathology", Horsfall, J. G., Baker, K. F., Zentmyer, G. A., eds. pp 65-92. Annual Reviews Inc., Palo Alto, Calif., U.S.A.). Microsclerotia (small sclerotial particles, 200-600 μm) of fungal plant pathogens such as *Colletatrichum truncation* and *Mycoleptodiscus terrestris* have been produced in high concentration in submerged liquid culture fermentation (Jackson and Schisler, 1995, Mycological Research, 99:879-884; Shearer and Jackson, 2003, U.S. Pat. No. 6,569,807). Microsclerotia of these pathogens of weedy plants have shown value as persistent, infective propagules in soil and aquatic environments (Shearer and Jackson, 2006, Biological Control. 38:298-306; Boyette et al., 2007, BioControl 52:413-426). However, to date, microsclerotia have not been reported for any fungal pathogens of insects.

SUMMARY OF THE INVENTION

We have now discovered the novel, hitherto undescribed, formation of microsclerotia by entomopathogenic fungi, which are effective for the control of insect pests, as well as techniques for the production of these microsclerotial propagules. In accordance with this discovery, microsclerotia may be produced from entomopathogenic fungi including *Metarhizium* species, *Beauveria* species, and *Lecanicillium* species. These microsclerotia are desiccation tolerant, survive low-cost, air-drying processes to low moisture levels, exhibit excellent shelf-life at room as well as refrigerated temperatures, and can be processed to formulation sizes which are compatible with conventional granular pesticide applicators. In use, the microsclerotia sporulate profusely (thus producing large number of insect-infectious conidia) upon rehydration such as in normal soil, and may exhibit comparable or even higher levels and rates of infectivity against insect, pests in comparison to conventional conidia-based granular formulations.

In accordance with this discovery, it is an object of this invention to provide entomopathogenic fungi in the form of microsclerotial propagules.

Another object of this invention is to provide microsclerotia propagules of entomopathogenic fungi which are effective as biological control agents against economically important insect pests.

A further object of this invention is to provide microsclerotia propagules of entomopathogenic fungi which are desiccation tolerant and storage stable, while retaining efficacy as biological control agents against insect pests.

Yet another object of this invention is to provide a method for producing these microsclerotia propagules of entomopathogenic fungi in high yields in submerged liquid culture. Other objects and advantages of the invention will become readily apparent from the ensuing description.

BRIEF DESCRIPTION OF THE DRAWINGS

FIG. 1 shows the relative efficacy of two types of *Metarhizium anisopliae* F52 granules against third instar *Tetanops myopaeformis* (Sugarbeet Root Maggot) larvae in a soil incorporation assay as described in Example 4. The granules consisted of either 20/30 mesh microsclerotia-containing granules prepared from liquid fermentation, or a more conventional, 16/30 mesh corn-grit carrier coated with conidia, using 10% polyoxyethylene sorbitan monooleate (TWEEN 30) binder. Granules were incorporated into a clay soil at the rate of 1.8 mg/g soil, and the soils subsequently wetted to the desired moisture endpoints with water. Soil water activities were determined after 48 hours using a water activity meter following the manufacturer's instructions. Each treatment had three replicates of 10 larvae and the entire test was replicated twice.

DETAILED DESCRIPTION OF THE INVENTION

As used herein, the term "microsclerotia" refers to small sclerotial bodies which are some resting state of the fungi. Microsclerotia are stable, viable, sometimes melanized, compact hyphal aggregates of the fungus. The microsclerotia per se are not infective, but when rehydrated such as by exposure to moisture in the soil or within the crevices in the bark of trees, the microsclerotia will germinate hyphally or sporogenically to produce conidia which are infective to the target insects. The microsclerotia are extremely desiccation tolerant, are capable of germinating both sporogenically and vegetatively, and also retain the insecticidal capabilities of their native or normal forms (i.e., hyphae, blastospores, and/or conidia of the same entomopathogenic fungus. Morphologically, the microsclerotia may be present as an agglomerated group of cells. The term "insecticide" refers to a material or mixture of materials which induce mortality, disrupt or impede growth, interfere with metamorphosis or other morphogenic functions, effect sterilization, or interfere with reproduction of the targeted insects. The terms "controlling" or "control of the target insect" is used herein to mean that the population of the insect is reduced, principally through mortality, at a level that is significantly greater than an untreated population. "Significant mortality" is defined herein to mean that the percentage of insects that die within a given period of time after coming into contact with the insecticide is significantly greater than the number of insects not contacted with the insecticide that die during the same period of time, based on standard statistical analyses.

The invention described herein is effective for producing microsclerotia from any species, strain or variety of entomopathogenic fungi from the genus *Metarhizium*, although it is also envisioned that the invention may be used to produce microsclerotia from, species from the genera *Beauveria* or *Lecanicillium*. Preferred species for use herein include *Beauveria bassiana, Metarhizium flavoviride*, and particularly *Metarhizium anisopliae* sensuo lato.

Production of the microsclerotia of this invention is preferably effected in liquid-culture, and large scale production is preferably conducted by deep-tank liquid-culture fermentation. It is also envisioned that solid culture media may be utilized. The liquid medium, used in the preparation of the melanized microsclerotia is critical, as their formation and yield are medium dependent. Generally, liquid media having high carbon and nitrogen concentrations are necessary for high yields of microsclerotia of *M. anisopliae*. For use herein, the medium, preferably contains a nitrogen source at a concentration between 8.1 grains nitrogen source/liter and less than 50 grams nitrogen source/liter, and a carbon source at a concentration greater than 20 grams of carbohydrate/liter, preferably greater than 30 grams carbohydrate/liter. Suitable nitrogen sources include, but are not limited, to hydrolyzed casein, yeast extract, hydrolyzed soy protein, hydrolyzed cottonseed protein, and hydrolyzed corn gluten protein. Suitable carbon sources include, but are not limited to carbohydrates, including glucose, fructose, and sucrose, and glycerol. The preferred liquid-culture media for use herein is described by Jackson (U.S. Pat. No. 5,968,808, the contents of which are incorporated by reference herein). We have surprisingly discovered that the above-mentioned entomopathogenic fungi produce microsclerotia when grown in submerged culture on the Jackson medium. These microsclerotia have not been hitherto described from these fungi. In contrast, species of the entomopathogenic fungus *Paecilomyces* produce blastospores rather than microsclerotia when grown in the same medium under the same conditions. The fermentation may be conducted using conventional aerobic liquid-culture techniques with agitation and aeration. Agitation is preferred to inhibit mycelial growth on the vessel wall. Suitable temperatures may range from about 20° C. to about 32+ C., and the pH may range from about 4 to about 8. Once a sufficiently heavy growth of the fungus has been obtained, usually in about 2-4 days, microsclerotia begin to form and the fermentation is then continued until a sufficiently high concentration of the microsclerotia is obtained. Without being limited thereto in a preferred embodiment, the fermentation is continued until a major proportion of the viable fungi in the culture (i.e., greater than 30% by weight), and more preferably until a predominant, proportion of the viable fungi in the culture (i.e., greater than 50% by weight) are in the form of microsclerotia. Following completion of the fermentation, the microsclerotia may be recovered using conventional techniques, such as by filtration or centrifugation. The microsclerotia may be dried, such as by air-drying, to a low moisture level, and stored at room temperature or lower. In a preferred embodiment the biomass recovered from the fermentation, following drying, will contain approximately $1 \times 10^6$ or higher microsclerotia per gram of biomass (based on dry weight of the biomass), particularly at least $9 \times 10^6$ microsclerotia per gram of biomass.

Commercial formulations for use as a biological insect control agent may be prepared from microsclerotia that have been harvested from the culture medium, such as described hereinabove. As a practical matter, it is envisioned that commercial formulations may be prepared directly from the culture, thereby obviating the need for any purification steps. While, liquid cultures may be used directly, in the preferred embodiment the water is removed from the cultures to partial or substantial dryness as described above, and the dried culture broken or ground into small particles suitable for application through conventional granule applicators, using techniques conventional in the art. To facilitate application and subsequent fungal outgrowth and conidiation, the harvested microsclerotia may alternatively be formulated in a suitable, agronomically acceptable, nutritional or inert carrier or vehicle for application as wettable powders, dusts, granules, baits, solutions, emulsifiable concentrates, emulsions, suspension concentrates and sprays (aerosols). For example, for liquid applications, the microsclerotia may be formulated as a suspension or emulsion. In this embodiment, preferred carriers include but are not limited to water, buffers, or vegetable or plant oils. In an alternative, preferred embodiment particularly suited for solid granular applications, the microsclerotia may be formulated with solid inert carriers or diluents such as diatomaceous earth, talc, clay, vermiculite, $CaCO_3$, corn cob grits, alginate gels, starch matrices or synthetic polymers, or they may be incorporated into conventional controlled release microparticles or microcapsules. The skilled practitioner will recognize that the fungi may also be formulated in combination with conventional additives such as sticking agents or adherents, emulsifying agents, surfactants, foams, humectants, or wetting agents, antioxidants, UV protectants, nutritive additives, fertilizers, insecticides, or even with fungicides which exhibit low toxicity to the subject fungi. For application onto the bark or canopy of trees and plants, the microsclerotia are also preferably formulated with a hygroscopic or hydrophilic adjuvant.

The absolute amount of the microsclerotia and their concentration in the final composition are selected to provide an effective reduction in the population of the target insect as compared to an untreated control. The actual amount is not critical and is a function of practical, considerations such as the properties of the vehicle or carrier, the density of the target insect population, and the method and site of application, and may be readily determined by routine testing. As the microsclerotia of this invention, serve to produce and deliver a high concentration of the infective conidia to control the target insects by infection and death, for purposes of formulation and application, an "effective amount" is defined to mean any quantity of microsclerotia sufficient to subsequently produce enough conidia in the target habitat to infect and kill the target insect relative to an untreated control. By way of example and without being limited thereto, it is envisioned that suitable formulations will typically contain about $1 \times 10^6$ or higher microsclerotia per gram of biomass recovered from the liquid culture (based on the dried weight of the biomass), preferably at least $1.5 \times 10^7$ microsclerotia per gram if biomass, For application to typical row crops, without being limited thereto, it is envisioned that suitable application rates are $1 \times 10^9$ microsclerotia per acre, applied in furrow.

In use, the microsclerotia of this invention may be applied to the locus or vicinity of the target insects or on the surface of the plants to be protected, e.g., onto tree bark, or as a seed coating, using conventional techniques. In a preferred embodiment, the microsclerotia are applied to the soil, or to soil-less potting mixes such as are used in greenhouses, in a granular form. Depending upon the target insect pest, the microsclerotia may be applied in agricultural fields, orchards, greenhouses, gardens or lawns, or on or in the vicinity of ornamental plants, trees, or commercial or residential structures.

The microsclerotia of the entomopathogenic fungi of this invention produce the infective propagules (aerial conidia) effective for infecting and killing a wide variety of economically important insects, particularly soil-born insects, but also including some ground- and canopy-dwelling insects. Without being limited thereto, insects which may be controlled by the microsclerotia of this invention include root weevils, rootworms, wire-worms, fruit flies, soil grubs, root maggots, termites, and ants, particularly corn rootworm (*Diabrotica* spp), black vine weevil (*Otiorhynchus sulcatus*), citrus root weevil (*Diaprepes abbreviatus*), sweet potato weevil. (*Cylas formicarius*), sugar-beet, root maggot (*Tetanops myopaeformis*), cabbage maggot (*Delia radicum*), onion maggot (*Delia antigua*), turnip maggot (*Delia floralis*), seedcorn maggot (*Delia platura*), carrot rust fly (*Psila rosae*), Japanese beetle (*Popillia japonica*), European chafer (*Rhizotrogus majalis*), subterranean termite (*Reticulitermes* and *Coptotermes* spp.). In addition, certain canopy dwelling, especially bark dwelling, insects may be controlled by microsclerotia of this invention. These insects include emerald ash borer (*Agrilus planipennis*), gypsy moth (*Lymantria dispar*), and the pecan weevil (*Curculio caryae*).

The following examples are intended only to further illustrate the invention and are not intended to limit the scope of the invention that is defined by the claims.

Example 1

Production of Microsclerotia

In this example we have, evaluated different liquid culture nutritional environments and measured biomass accumulation and blastospore and microsclerotia yields. The desiccation, tolerance of microsclerotia was measured by evaluating their ability to germinate vegetatively and/or sporogenically upon rehydration.

Three strains of *Metarhizium anisopliae* var. *anisopliae* (Metchnikoff) Sorokin were used in this study: a commercial strain, F52 (ATCC 90448, (Earth Biosciences, now Novozyme Biologicals, Salem, Va., reisolated from *Tetanops myopaeformis* larvae), MA1200 (ATCC 62176, passaged through *T. myopaeformis* larvae), and TM109 (AR-SEF5520 reisolated from *T. myopaeformis* larvae). All isolates were stored at −80° C. at USDA ARS NPARL and at USDA ARS NCAUR. Stock Cultures of each strain of *M. anisopliae* were grown as single spore isolates on potato dextrose agar (PDA) for three weeks at room temperatures. The sporulated plate was cut into 1 mm$^2$ agar plugs and stock cultures of these agar plugs stored in 10% glycerol at −80° C. Conidial inocula for liquid culture experiments were produced by inoculating PDA plates with a conidial suspension from the frozen stock cultures and growing these cultures at room temperature (~22° C.) for 2-3 wks. All liquid cultures were inoculated at an initial concentration of $5 \times 10^6$ conidia ml$^{-1}$ culture broth.

The six liquid media tested were composed of a basal salts medium supplemented with trace metals, vitamins (Jackson et al., 1997, Mycological Research, 101:35-41) and various combinations of glucose and acid hydrolyzed casein, and casamino acids. The defined basal salts solution used in all liquid cultures contained per liter of deionized water: $KH_2PO_4$, 4.0 g; $CaCl_2 \cdot 2H_2O$, 0.8 g; $MgSO_4 \cdot 7H_2O$, 0.6 g; $FeSO_4 \cdot 7H_2O$, 0.1 g; $CoCl_2 \cdot 6H_2O$, 37 mg; $MnSO_4 \cdot H_2O$, 16 mg; $ZnSO_4 \cdot 7H_2O$, 14 mg; thiamin, riboflavin, pantothenate, niacin, pyridoxamine, thiotic acid, 500 microgram each; and folic acid, biotin, vitamin $B_{12}$, 50 microgram each. In Table 1, the amounts of glucose and acid-hydrolyzed casein, and the corresponding carbon concentration and carbon-to-nitrogen are given for each medium tested. Carbon concentrations and carbon to nitrogen ratios calculations were based on 40% carbon in glucose and 53% carbon, 8% nitrogen in acid hydrolyzed casein.

All cultures were grown as 100 ml cultures in 250 ml baffled, Erlenmeyer flasks at 28° C. and 300 rpm in a rotary shaker incubator. Flasks were hand-shaken frequently to inhibit mycelial growth on the flask wall. At two, four, and eight days post inoculation, samples were taken to measure biomass accumulation, blastospore concentrations, and microsclerotia concentrations. For each experiment, duplicate samples were made from each flask on each sampling date, and three replicate flasks for each media were used. All experiments were repeated at least twice.

For biomass accumulation measurements, one ml of whole culture broth was collected from culture flasks and the biomass was separated from the spent medium by vacuum filtration onto pre-weighed filter disks (Whatman GF/A, Maidstone, England). Dry weight accumulation was determined by drying the biomass and filter disk at 60° C. to a constant weight prior to measurement. To determine microsclerotia concentrations, culture broth was diluted appropriately and a drop placed on a glass microscope slide, overlaid with a coverslip and the number of microsclerotia counted in 100 microliters. Microsclerotia were counted when compact, sometimes melanized, hyphal aggregates were larger than 200 microns. Only well formed microsclerotia were counted. Culture broth was diluted as appropriate for ease of counting. During culture broth sampling, microsclerotial suspensions were constantly vortexed to ensure homogeneity After growing the *M. anisopliae* cultures for eight days, diatomsceous earth (HYFLO, Celite Corp., Lompoc, Calif.) was added to the combined fungal biomass of the three flasks in each treatment at a concentration of 5 g diatomaceous earth/100 ml culture broth. The microsclerotial-diatomaceous earth mixture was vacuum-filtered in a Buchner funnel using Whatman No. 54 filter paper. The filter cake was broken up by pulsing in a blender (MINI PREP Plus, Cuisinart) and layered in shallow aluminum trays and air-dried overnight in an operating biological containment hood. The moisture content of the microsclerotia-diatomaceous earth preparation was determined with a moisture analyzer. When *M. anisopliae* formulations dried to a moisture content approx. 5%, they were vacuum packed in synthetic polyethylene bags with a vacuum packer and stored at 4° C. Upon rehydration, microsclerotia of *M. anisopliae* germinated hyphally (germ tube formation) and conidiated (produced conidial masses on the surface of the microsclerotium). Microsclerotia viability (hyphal germination) and spore production (sporogenic germination) were determined on dried microsclerotia preparations by sprinkling 25 mg of the dried microsclerotia formulation onto the surface of water agar plates. Two water agar plates were used for each treatment. Following a 24 hr incubation period at 28° C., 100 microsclerotia were microscopically examined on each plate for hyphal germination as a measure of viability. To enumerate spore production, the incubation of the water agar plates was continued for eight days at 28° C. Each water agar plate was flooded with 5 ml of sterile water and the conidia were dislodged from the microsclerotia with a sterile loop. After the conidia were dislodged, the available liquid was pipetted from each plate and the liquid volume measured. Conidia were counted using a hemacytometer. To determine the number of conidia of *M. anisopliae* produced per g of dried microsclerotia formulation, the number of conidia harvested per plate was divided by the weight of the dried microsclerotia preparation added to each plate (0.025 g).

Results

Biomass accumulation by the three strains of *M. anisopliae* followed the predicted pattern where those grown in media that contained 8 g/l carbon produced lower biomass concentrations when compared to those grown in media with 36 g/l carbon (Table 2). When comparing cultures grown in media with differing carbon-to-nitrogen ratios, biomass accumulation was not affected by nitrogen content for those grown in media with a carbon concentration of 8 g/l suggesting that the medium was carbon-limited. For all strains of *M. anisopliae* grown in media containing 36 g/l carbon, biomass accumulation was significantly higher after 4 and 8 days growth for cultures grown in lower carbon-to-nitrogen (higher nitrogen content) media suggesting that nitrogen was growth limiting (Table 2).

The formation, yield, and melanization of microsclerotia by *M. anisopliae* were strain and medium dependent (Table 3). While microsclerotia formation could be seen in all media and with all strains of *M. anisopliae*, highest microsclerotia concentrations were measured on days 4 and 8 post inoculation in rich media (36 g/l carbon) by *M. anisopliae* strain F52. On day 8, rich media with carbon-to-nitrogen ratios of 30:1 and 50:1 yielded 2.7 and $2.9 \times 10^5$ microsclerotia/ml, respectively (Table 3). Microsclerotia formed by *M. anisopliae* strain F52 in media with a carbon-to-nitrogen ratio of 50:1 were more highly melanized compared to microsclerotia formed in media with higher carbon-to-nitrogen ratios.

The desiccation tolerance of air-dried, microsclerotia from 8-day-old cultures showed that all cultures and strains of *M. anisopliae* produced microsclerotia that survived the drying process with no significant loss in viability except those cultures grown in weak media with low nitrogen content [8 g/l carbon, 50:1 carbon-to-nitrogen ratio (Table 4)]. Conidia production by air-dried microsclerotia for all strains of *M. anisopliae*, regardless of media, was greater than $1 \times 10^8$ conidia/g dried formulate (Table 3). In general, dried microsclerotia formulations from the rich media (media 4, 5, 6) produced higher numbers of conidia when compared to microsclerotia formulates derived from the media with lower carbon concentrations. In addition, cultures of *M. anisopliae* grown in rich media produced more biomass (Table 2) which resulted in higher yields of dried microsclerotia formulations.

Example 2

Assessment of Fungal Outgrowth and Sporulation From Microsclerotia on Different Soils The fungal outgrowth and sporulation of *M. anisopliae* strain MA1200 from microsclerotial granules produced from Medium 4, 5, and 6 were evaluated on moist soil plates. The granules were prepared as described earlier, sieved to a 0.6-1.7 mm particle size, and stored in sealed plastic bags at 5-7° C., for 9 months prior to use. A clay soil from a sugarbeet field in Sidney Mont., a clay loam soil collected from a sugarbeet field near St. Thomas, N. Dak., and a sandy-loam soil from Torrington, Wyo. were separately air dried to a moisture content less than 2%, pulverized and sieved through as 20-mesh (U.S.) sieve to a uniform particle size range. Soil texture was determined by standard methods (Sheldrick and Wang, 1993, Particle size distribution. In, Soil Sampling and Methods of Analysis, M. R. Carter, Ed. Can. Soc. Soil Science, Lewis Publishers, Boca Raton, Fla., pp. 499-512). All soils tested were non-sterile. The three soils were placed in Petri dishes and wetted with reverse osmosis water to 20% field capacity (as previously determined for each soil). Microsclerotia-containing granules of *M. anisopliae* from each production medium were sprinkled onto the surface of three replicate plates of each soil. The plates were placed in resealable plastic bags and incubated at 25° C. Granules were visually examined for fungal outgrowth and conidiation 3 and 7 days later.

Fungal outgrowth and sporulation of *M. anisopliae* strains MA1200, F52 and TM109 produced from Medium 5 and corn-grit based granules of *M. anisopliae* strain F52 (see bioassays, below) were also evaluated on moist, clay soli plates. The non sterile clay soil was the same as used earlier. The evaluation protocol was as described previously, with visual observations daily, beginning on Day 3.

Results

Medium 4 (10:1 C:N Ratio, 36 g Carbon/L) granules: By Day 3 a compact fungal outgrowth typical of *M. anisopliae* was present on all microsclerotial granules incubated in the three soils tested. Less than 10% had a greenish tinge indicative of initial conidiation. On Day 7, the microsclerotial granules were largely covered with a fungal hymenium but conidiation was not prominent.

Medium 5 (30:1 C:N Ratio, 36 g Carbon/L) granules: On Day 3, compact fungal outgrowth and conidiation was; present on all granules on all three soils. There was also a small amount of more erect, filamentous growth. By Day 7, intense conidiation of *M. anisopliae* was present on all grannies, on ail three soils.

Medium 6 (50:1 C:N Ratio, 36 g Carbon/L) granules: On Day 3, fungal outgrowth was weak and spotty on the clay loam and sandy loam soils. On the clay soil, fungal outgrowth was very sparse. By Day 7, fungal outgrowth and the typical green conidiation had occurred on essentially all granules on all three soils. While the extent of conidiation was not quantified, levels of conidiation for the various soils tested followed the pattern; sandy loam soil>clay loam soil>clay soil.

By Day 3, microsclerotial granules of MA1200, F52 and TM109 had fungal outgrowth, unlike corn grit, granules of *M. anisopliae* strain F52. Strain TM109 granules had compact hymenium on their surfaces with areas of profuse conidiation. Outgrowth on the strain F52 and MA1200 granules was less robust; strain F52 granules had more visible conidiation than strain MA1200. There was very little outgrowth on the strain F52 corn grit granules with most growth consisting of simple scattered mycelial strands. On Day 4, conidiation was visibly underway with strain Ma1200 and TM109 on corn grit granules, but absent from the corn grit granules inoculated with strain F52. By Day 5, all microsclerotial granules of *M. anisopliae* had profuse compact green conidiation. Compared to microsclerotial granules, the corn grit granules of all the strains of *M. anisopliae* tested continued to have sparse fungal outgrowth and little conidiation until Day 7-8 (FIG. 2). Subsequent to Day 8, sporulation became more robust but never achieved the same visual extent as the microsclerotial granules.

Example 3

Relative Efficacy of Microsclerotial Granules Produced by the Six Media in Example 1

The relative biological efficacy of the microsclerotial granules produced by strain F52 in all six media was evaluated using soil-based bioassays with larval sugarbeet root maggots (SBRM). Granules (20/30 mesh) of F52 from all six media were incorporated into a dry, sieved, non-sterile clay soil used earlier at the rate of 14 mg granules/60 g soil. Two separate production batches of granules were evaluated. The granules had been stored in sealed plastic bags at 5-9° C. for 7 months prior to use. The soils were moistened with reverse osmosis water to an end point of 15% Field Capacity (previously determined) and the water potentials determined with an AQUALAB moisture meter (Decagon Products, Pullman, Wash.). Resulting soil moistures were 0.982-0.983 $A_w$ (−2.32 to −2.47 MPa matric potential), which moistures were sufficient for fungal outgrowth and sporulation. Permanent Wilting Point for most plants is 0.989 $A_w$. An untreated control soil was prepared simply by wetting an additional aliquot of soil, without any granules, with the same amount of water. Each treated and control soil was then dispensed equally into three 60 cc, lidded, plastic, condiment cups. The cups were sealed and placed on a layer of water-moistened paper towel (to maintain humidity) in a large, lidded plastic container, and incubated at 24° C. After 1 week, the soils were infested with 10 third-instar SBRM larvae per cup. These larvae were field-collected, in diapause yet motile and non-feeding, and had been stored in moist sterile sand at 3-4° C. for several months prior to use. Each treatment was replicated three times. Larval mortality was determined weekly for three weeks, Each week, all cadavers were removed and placed at 95-100% high humidity for three days to elicit the presence of mycosis. Two separate production lots were evaluated in this manner.

For statistical analyses of bioassay data, all mortality data were adjusted for control mortality, when necessary, by application of Abbott's correction (Abbott, 1925) and then subjected to angular transformation before further analysis.

Data were then subjected to ANOVA and Tukey's BSD mean separation test when significant treatment, effects were identified.

Results

There were no significant differences in efficacy between the two production batches of microsclerotial granules for any of the media tested at 1 and 3 weeks (F=0.06, p=0.83 for week 1; F=1.51 p=0.34 for week 3), and a barely significant difference at Week 2 (F=23.94, p=0.04), due to mortalities from Medium 1 microsclerotial granules being significantly different between the two batches. Control mortality for SBRM was 0% even after three weeks. Data are presented in Table 5. Significant differences existed among the early mortalities from granules produced on the six media, in both batches, one week after treated soils were infested with larvae (F=6.41, 5 df, p=0.004 for Batch E050509, and F=4.94, 5 df, p=0.011 for Batch E050516). When the data for both batches were pooled, granules from Medium 4 and 5 were significantly better than the rest (Tukey's HSD, p=0.05). By three weeks after infestation, mortalities of larvae had reached 100% in most of the treatments with significant differences among Media 2-6 disappearing; Medium 1 granules performed more poorly than the rest.

Example 4

Comparison of Efficacy of Microsclerotial Granules with Conventional Nutritive Carrier Granules in Two Different Soils A bioassay was also conducted to compare the strain F52 microsclerotial granules from Medium 5 with more conventional corn grit-based granules that have been used in laboratory work and field trials against the SBRM (Jaronski et al., 2006, Challenges in using *Metarhizium anisopliae* for control of Sugarbeet Root Maggot, *Tetanops myopaeformis*. Bulletin IOBC/wprs 30(7):119-124; Campbell et al., 2006, Environmental Entomology. 35 (4):986-991; Jaronski & Campbell, 2006, 2005 Sugarbeet Research and Extension Reports. 36:185-189; Majumdar et al., 2006, 2005 Sugarbeet Research and Extension Reports. 36:222-227). The evaluation was conducted in two soils, a clay-loam soil collected from a sugarbeet field near St. Thomas, N. Dak., and the clay soil used earlier. The corn grit granules consisted of a 16/30 mesh corn grit carrier (Bunger Milling, St. Louis, Mo.) coated with conidia using a 10% aqueous polyoxyethylene sorbitan monooleate (TWEEN 80) binder. Target concentration of conidia on these granules was 1-2× $10^5$ conidia/granule. These corn grit-based granules were freshly prepared using dry conidia produced with solid substrate fermentation and refrigerated until use. The dry microsclerotial granules from Medium 5 were sieved to 20/32 mesh size before use. When placed in a sufficiently moist ($A_w$>0.95) environment such as water agar, moist soil, or moist filter paper, the corn grit granules become covered with a second generation of conidia within 7-10 days, while the microsclerotial granules sporulated profusely within 3-4 days. The bioassay was conducted as described earlier but with a rate of 112 mg granules/60 gram dry soil. Soils were hydrated to 15% Field Capacity for each soil. This level of moisture resulted in measured $A_w$ of 0.983 and 0.984 for the two soils as determined by the Aqualab meter. Three replicate cups of 10 larvae each were used for each treatment, SBRM larvae were added after the soils had been incubated for 1 week at 24° C. Larval mortalities were determined after 1, 2, and 3 weeks, as described earlier.

Results

In both clay-loam and clay soils, the microsclerotial granules from Medium 5 had significantly greater efficacy than the more traditional conidia-covered corn grit granule. Mortality from the microsclerotial granule was 100% within 1 week of infesting treated soils with larvae (Table 6). In the clay soil, the corn grit-based granules caused only a low larval mortality.

Example 4

Comparison of Efficacy of Microsclerotial Granules with Conventional Nutritive Carrier Granules at Different Soil Moistures Additional bioassays were conducted to compare the granules from Medium 5 with the corn grit granules at several soil moisture levels. Granules were incorporated into a clay soil at the rate of 1.8 mg/g soil, and the soils subsequently wetted to the desired moisture endpoint with water. These assays were conducted as described previously, with 3 replicate cups of 10 larvae each, per treatment, except that clay soil was moistened to either 7.5% ($A_w$=0.836), 10% ($A_w$=0.919), 15% ($A_w$=0.983), or 20% ($A_w$=0.991) Field Capacity. Moisture levels were verified two days after inoculation with conidia and hydration using an AQUALAB water activity meter (Decagon Devices, Inc.) The entire assay was replicated twice. Larval mortality was determined by destructive sampling 3 weeks later. Any cadavers without sporulating fungus on their exteriors were removed and incubated at high humidity for three day to evince presence of mycosis.

Results

When the efficacy of microsclerotial granules from Medium 5 were compared with the corn grit granules at several soil moisture levels, the former caused a significantly higher SBRM mortality at moisture levels of 0.919 $A_w$ and above (FIG. 1). Larval mortality was 100% vs. 20 and 30% for the corn grit based granules at Aw levels of 0.983 and 0.991. At a moisture of 0.919 Water Activity units, larval mortality from exposure to the microsclerotial granules was 20% vs. 6% for the corn grit granules. Control mortality was less than 10% at all moisture levels. Overall, the microsclerotial granules caused a much higher mortality in these undersaturated soils because the microsclerotia produced more infectious conidia faster than the conventional granule formulation. These data underscore the superiority of microsclerotial granules over conidia-containing nutritive substrates.

It is understood that the foregoing detailed description is given merely by way of illustration and that modifications and variations may be made therein without departing from the spirit and scope of the invention.

TABLE 1

Carbon concentration (g $L^{-1}$) and carbon-to-nitrogen ratio in liquid cultures used to assess the growth and yields of different strains of *M. anisopliae*.

| C (g $L^{-1}$) | C:N | Glucose (g $L^{-1}$) | Casamino Acids (g $L^{-1}$) |
| --- | --- | --- | --- |
| 8 | 10:1 | 10.0 | 10.0 |
| 8 | 30:1 | 16.6 | 3.4 |
| 8 | 50:1 | 18.0 | 2.0 |
| 36 | 10:1 | 45.0 | 45.0 |
| 36 | 30:1 | 75.0 | 15.0 |
| 36 | 50:1 | 81.0 | 9.0 |

TABLE 2

Comparison of various media on the production of biomass by *Metarhizium anisopliae* in liquid culture after 2, 4, and 8-days growth.

| *Metarhizium anisopliae* Isolate | Medium | Carbon Conc (g/l) | Carbon-to-Nitrogen Ratio | Biomass (mg/ml) | | |
|---|---|---|---|---|---|---|
| | | | | Day 2 | Day 4 | Day 8 |
| Ma 1200 | 1 | 8 | 10:1 | 2.5a | 5.5d | 3.8d |
| | 2 | 8 | 30:1 | 2.5a | 4.5d | 5.0d |
| | 3 | 8 | 50:1 | 1.5a | 4.5d | 4.4d |
| | 4 | 36 | 10:1 | 2.7a | 22.2a | 26.6a |
| | 5 | 36 | 30:1 | 3.5a | 14.8b | 18.9b |
| | 6 | 36 | 50:1 | 2.1a | 10.0c | 13.3c |
| F52 | 1 | 8 | 10:1 | 1.1c | 8.2d | 3.2c |
| | 2 | 8 | 30:1 | 3.4a | 5.4e | 5.5c |
| | 3 | 8 | 50:1 | 1.7c | 4.0e | 3.5c |
| | 4 | 36 | 10:1 | 2.0b, c | 22.6a | 33.0a |
| | 5 | 36 | 30:1 | 3.8a | 19.7b | 21.6b |
| | 6 | 36 | 50:1 | 3.2a, b | 11.8c | 18.3b |
| TM109 | 1 | 8 | 10:1 | 0.8c | 5.2c | 4.5d |
| | 2 | 8 | 30:1 | 0.7c | 3.1c, d | 3.8d |
| | 3 | 8 | 50:1 | 0.6c | 2.2d | 4.0d |
| | 4 | 36 | 10:1 | 1.0b, c | 12.7a, b | 30.5a |
| | 5 | 36 | 30:1 | 1.7a | 13.7a | 24.0b |
| | 6 | 36 | 50:1 | 1.5a, b | 10.6b | 14.0c |

For each isolate, mean values followed by different letters are significantly different using Tukey-Kramer HSD. Mean values are derived from 6 values (3 separate experiments run in duplicate for each treatment).

TABLE 3

Comparison of various media on the production of microsclerotia by *Metarhizium anisopliae* in liquid culture after 2, 4, and 8-days growth.

| *Metarhizium anisopliae* Isolate | Medium | Carbon Conc (g/l) | Carbon-to-Nitrogen Ratio | Microsclerotia (microsclerotia/ml × $10^4$) | | |
|---|---|---|---|---|---|---|
| | | | | Day 2 | Day 4 | Day 8 |
| Ma 1200 | 1 | 8 | 10:1 | 3.1a | 10.6a, b | 15.3a |
| | 2 | 8 | 30:1 | 0.5b | 2.7c | 6.4b, c |
| | 3 | 8 | 50:1 | 0.5b | 2.4c | 4.9c |
| | 4 | 36 | 10:1 | 1.7a, b | 5.7b, c | 12.0a, b |
| | 5 | 36 | 30:1 | 2.3a, b | 7.7b, c | 9.3a, b, c |
| | 6 | 36 | 50:1 | 2.1a, b | 15.3a | 14.7a |
| F52 | 1 | 8 | 10:1 | 0.8b | 10.5a | 5.3b |
| | 2 | 8 | 30:1 | 1.7b | 6.4a, b | 11.7b |
| | 3 | 8 | 50:1 | 2.3b | 5.0b | 8.5b |
| | 4 | 36 | 10:1 | 8.0a | 10.3a | 9.3b |
| | 5 | 36 | 30:1 | 7.9a | 11.0a | 27.0a |
| | 6 | 36 | 50:1 | 9.5a | 6.8a, b | 29.0a |
| TM109 | 1 | 8 | 10:1 | 0.0a | 2.0a, b | 1.2a |
| | 2 | 8 | 30:1 | 0.7a | 1.2b | 1.8a |
| | 3 | 8 | 50:1 | 0.6a | 0.2b | 1.0a |
| | 4 | 36 | 10:1 | 0.2a | 1.9a, b | 5.3a |
| | 5 | 36 | 30:1 | 0.5a | 2.0a, b | 3.7a |
| | 6 | 36 | 50:1 | 0.3a | 4.9a | 3.9a |

*For each isolate, mean values followed by different letters are significantly different using Tukey-Kramer HSD. Mean values are derived from 6 values (3 separate experiments run in duplicate for each treatment).

TABLE 4

Evaluation of the desiccation tolerance and conidia production capability of air-dried microsclerotia of *Metarhizium anisopliae*.

| *Metarhizium anisopliae* Isolate | Medium | Carbon Conc (g/l) | Carbon-to-Nitrogen Ratio | Hyphal Germination (% microsclerotia) | Sporogenic Germination (conidia/g dried formulate × $10^7$) |
|---|---|---|---|---|---|
| Ma 1200 | 1 | 8 | 10:1 | 100a | 24.0b |
| | 2 | 8 | 30:1 | 100a | 29.5b |
| | 3 | 8 | 50:1 | 87b | 28.0b |
| | 4 | 36 | 10:1 | 100a | 42.3b |
| | 5 | 36 | 30:1 | 100a | 97.5a |
| | 6 | 36 | 50:1 | 99a | 21.5b |
| F52 | 1 | 8 | 10:1 | 99a | 53.5b |
| | 2 | 8 | 30:1 | 96a | 64.5b |
| | 3 | 8 | 50:1 | 99a | 46.5b |
| | 4 | 36 | 10:1 | 100a | 114.5a |
| | 5 | 36 | 30:1 | 100a | 82.5a, b |
| | 6 | 36 | 50:1 | 97a | 82.3a, b |
| TM109 | 1 | 8 | 10:1 | 85a, b | 18.1b |
| | 2 | 8 | 30:1 | 93a, b | 15.4b |
| | 3 | 8 | 50:1 | 46b | 16.0b |
| | 4 | 36 | 10:1 | 100a | 81.3a, b |
| | 5 | 36 | 30:1 | 100a | 94.3a |
| | 6 | 36 | 30:1 | 100a | 63.8a, b |

For each isolate, mean values followed by different letters are significantly different using Tukey-Kramer HSD. Mean values are derived from 4 values (2 separate experiments run in duplicate for each treatment).

TABLE 5

Mortality of third-instar *Tetanops myopaeformis* larvae exposed to microsclerotial granule-treated soils, 1, 2, and 3 weeks post-infestation. Microsclerotial granules of *Metarhizium anisopliae* Strain F52 prepared from liquid cultures produced in media 1-6.

| Treatment | 1 Week | | 2 Weeks | | 3 Weeks | |
|---|---|---|---|---|---|---|
| | Mortality* | Mycosis | Mortality | Mycosis | Mortality | Mycosis |
| Test 1 (Batch 050509) | | | | | | |
| Medium 1 | 0% b | — | 23.3% b | 71.4% | 46.7% b | 71.4% |
| Medium 2 | 6.7% ab | 50.0% | 50% ab | 100% | 96.7% a | 100% |
| Medium 3 | 10.0% ab | 66.7% | 63.3% a | 100% | 100% a | 100% |

TABLE 5-continued

Mortality of third-instar *Tetanops myopaeformis* larvae exposed to microsclerotial granule-treated soils, 1, 2, and 3 weeks post-infestation. Microsclerotial granules of *Metarhizium anisopliae* Strain F52 prepared from liquid cultures produced in media 1-6.

| | 1 Week | | 2 Weeks | | 3 Weeks | |
|---|---|---|---|---|---|---|
| Treatment | Mortality* | Mycosis | Mortality | Mycosis | Mortality | Mycosis |
| Medium 4 | 36.7% a | 100% | 76.7% a | 100% | 100% a | 100% |
| Medium 5 | 26.7% a | 75% | 56.7% a | 100% | 96.7% a | 100% |
| Medium 6 | 6.7% ab | 100% | 70.0% a | 100% | 100% a | 100% |
| ANOVA statistics | F = 6.41, 5 df, p = 0.004 | | F = 7.55, 5 df, p = 0.002 | | F = 19.9, 5 df, p < 0.001 | |
| Test 2 (Batch 050516) | | | | | | |
| Medium 1 | 0.0% b | | 63.3% a | 94.7% | 86.7% a | 85.7% |
| Medium 2 | 6.7% b | 100% | 76.7% a | 81% | 96.7% a | 100% |
| Medium 3 | 0.0% b | | 53.3% a | 81.3% | 96.7% a | 100% |
| Medium 4 | 26.7% a | 100% | 70% a | 100% | 100% a | 100% |
| Medium 5 | 16.7% ab | 80% | 70% a | 100% | 90% a | 100% |
| Medium 6 | 13.3% ab | 75% | 73% a | 100% | 96.7% a | 100% |
| ANOVA statistics | F = 4.94, 5 df, p = 0.011 | | F = 0.66, 5 df, p = 0.66 | | F = 0.93, 5 df, p = 0.49 | |

*Mortalities are the mean of three replicates and if followed by different letter in a column, are significantly different (Tukey's HSD, P < .05).

TABLE 6

Mortality of third instar larvae of *Tetanops myopaeformis* exposed to microsclerotial granule-treated soils, 1 2, and 3 weeks post-infestation. Mortalities are the mean of three replicates (S.D.) and if followed by different letter in a column, are significantly different (Tukey's HSD, P < .01). Mycosis was 100% among all cadavers.

| | | Mortality | | |
|---|---|---|---|---|
| Soil | Treatment | 1 Week | 2 Weeks | 3 Weeks |
| Clay | Untreated | 0% a | 0% a | 0% a |
| | Micro-sclerotial Granule | 100% b | 100% c | 100% c |
| | Corn Grit Granule | 0% a | 23.3% (15.3%)b | 26.71 (15.3%)b |
| Clay-loam | Untreated | 0% a | 0% a | 0% a |
| | Micro-sclerotial Granule | 100% b | 100% c | 100% c |
| | Corn Grit Granule | 0% a | 0% a | 0% a |

We claim:

1. A method of producing desiccation tolerant fungal microsclerotia, comprising the steps of:

a) inoculating a liquid culture medium comprising a carbon source and a nitrogen source with fungal propagules of an entomopathogenic fungus selected from the group consisting of *Metarhizium* species, *Beauveria* species, and *Lecanicillium* species, said nitrogen source having a concentration between 8.1 grams/liter and 50 grams/liter and said carbon source having a concentration greater than 20 grams/liter;

b) incubating the propagules for a sufficient time to allow for production of micro sclerotia; and c) collecting the resulting microsclerotia, thereby producing said desiccation tolerant fungal microsclerotia.

2. A method for insect control comprising applying to the locus of said insects an insecticidally effective amount of microsclerotia of an entomopathogenic fungus produced by the method of claim 1.

3. The method of claim 2, wherein said fungus comprises a *Metarhizium* species.

4. The method of claim 3, wherein said *Metarhizium* species is *M. anisopliae*.

5. The method of claim 2, wherein said insects are selected from the group consisting of root weevils, soil grubs, rootworms, wireworms, fruit flies, and root maggots.

6. The method of claim 2, wherein said insects are selected from the group consisting of subterranean termites (*Reticulitermes* and *Coptotermes* spp.), corn rootworms (*Diabrotica* spp), black vine weevils (*Otiorhynchus sulcatus*), wireworms (larvae of family Elateridae), citrus root weevils (*Diaprepes abbreviatus*), sugarbeet root maggots (*Tetanops myopaeformis*), cabbage/turnip/onion/seed corn maggots (*Delia* spp.), carrot rust fly (*Psila rosae*), sweet potato weevils (*Cylas formicarius*), Japanese beetles (*Popillia japonica*), and European chafers (*Rhizotrogus majalis*).

7. The method of claim 5, wherein said applying comprises applying said microsclerotia to soil or greenhouse soilless potting mix.

8. The method of claim 2, wherein said insects are plant foliage or tree bark inhabiting insects selected from the group consisting of emerald ash borer (*Agrilus planipennis*), and gypsy moth (*Lymantria dispar*), and pecan weevil (*Curculio caryae*).

9. The method of claim 8, wherein said microsclerotia are applied to the bark and canopy of plants and trees.

* * * * *